United States Patent [19]

Yamade et al.

[11] Patent Number: 4,788,409

[45] Date of Patent: Nov. 29, 1988

[54] METHOD OF AND APPARATUS FOR AUTOMATICALLY CONDUCTING ALL POSITION PLASMA WELDING OF PIPES

[75] Inventors: Takashi Yamade, Hitachi; Seishi Watahiki, Katsuta; Yasuzi Sakuma, Hitachi; Masayoshi Yamaguchi, Hitachi; Shinichi Kurita, Hitachi, all of Japan

[73] Assignee: Hitachi, Ltd., Tokyo, Japan

[21] Appl. No.: 84,555

[22] Filed: Aug. 11, 1987

[30] Foreign Application Priority Data

Aug. 13, 1986 [JP] Japan .................. 61-188481

[51] Int. Cl.⁴ .............................................. B23K 5/00
[52] U.S. Cl. ........................ 219/121.46; 219/130.5; 219/60 A; 219/121.54; 219/121.59; 219/121.45
[58] Field of Search ........... 219/130.5, 124.02, 124.03, 219/74, 75, 121 PT, 121 PU, 121 PV, 121 PN, 121 PS, 121 PK, 121 PY, 137 R, 122, 128

[56] References Cited

U.S. PATENT DOCUMENTS

| | | | |
|---|---|---|---|
| 3,749,802 | 7/1973 | Camacho | 219/121 PV |
| 4,168,406 | 9/1979 | Torrani | 219/60 A |
| 4,195,216 | 3/1980 | Beauchamp et al. | 219/121 P |
| 4,280,041 | 7/1981 | Kiessling et al. | 219/121 PT |
| 4,421,971 | 12/1983 | Ukai et al. | 219/128 |
| 4,578,562 | 3/1986 | Lindstrom et al. | 219/130.5 |
| 4,647,753 | 3/1987 | Nakashoma et al. | 219/130.5 |

FOREIGN PATENT DOCUMENTS 2544539  1/1977  Fed. Rep. of Germany .
50-11856  5/1975  Japan .
54-24977  8/1979  Japan .
59-191568 10/1984 Japan .
60-27473  2/1985  Japan .

OTHER PUBLICATIONS

"Plasma Arc Welding", by Hobart School of Welding.

Primary Examiner—M. H. Paschall
Attorney, Agent, or Firm—Antonelli, Terry & Wands

[57] ABSTRACT

A plasma welding method has successive steps including pre-heating of members to be welded, tack welding of the members for tentatively fixing these members, keyhole welding for completely welding the members to each other, and finish padding. These steps are automatically conducted by a single plasma welding apparatus operative in accordance with a programmed sequence including data concerning the optimum conditions of operation in each step in relation to the conditions such as sizes and materials of the members to be welded. The apparatus has a welding torch, a welding head on which the welding torch is mounted for rotation, a controller adapted for storing the optimum welding conditions for successive steps of the welding process in relation to the conditions of the members to be welded, a power supply system for transmitting welding current and welding speed signal to the welding head in accordance with a command provided by the controller, and a gas supply system for supplying a plasma gas at a rate determined in accordance with a command from the controller.

5 Claims, 4 Drawing Sheets

METHOD OF AND APPARATUS FOR AUTOMATICALLY CONDUCTING ALL POSITION PLASMA WELDING OF PIPES

BACKGROUND OF THE INVENTION

The present invention relates to a method of and an apparatus for conducting plasma welding. More particularly, the invention is concerned with plasma welding method and apparatus suitable for all-position welding of an object, such as a circumferential joint of a pipe, which requires uniform penetration bead formed by, for example, keyhole welding.

Plasma welding method has been put into practical use in recent years. This welding method features a higher energy density of arc and a greater length of arc so that welding can be effected with higher heat input rate and, hence, at higher efficiency than conventional welding methods such as TIG (Tungsten-Inert-Gas) welding.

Briefly, the plasma welding employs a plasma jet of a high temperature which penetrates a base metal to form a keyhole in the base metal while arc welding is executed. Plasma welding apparatus which have been used hitherto have been designed for flat welding or down hand welding.

Recently, however, there has been an increasing demand for all-position welding. All-position welding by plasma welding method, however, requires a considerably high level of skill because the plasma welding apparatus was intended for a single purpose skill such as keyhole welding or surface fusion welding.

Actual welding operation by plasma welding method is conducted by a licensed operator. The operator is required to handle different types of welders and other machines in different steps of the welding process, such as tack welding, pre-heating, keyhole welding and finish padding.

More specifically, tack welding is conducted for the purpose of fixing welding objects together in advance of the welding and also for the purpose of preventing any thermal distortion which would otherwise be caused by the heat applied during the welding. The tack welding has thus been conducted typically by TIG welding. The pre-heating is necessary for preventing cracking which may occur as a result of contraction of the weld metal during solidification thereof and also for avoiding any influence of welding heat which may cause an undesirable effect on the metallurgical structure of the base metal. The pre-heating has been effected typically by induction heating or by means of flame of a burning gas.

Thus, the known plasma welding method requires various preparatory operations such as tack welding and pre-heating and, in addition, no specific consideration has been given hitherto for the application of the plasma welding method to a welding object which requires a strict control of the welding operation, e.g., all-position welding of pipe joints. In consequence, it has been necessary that a licensed operator conducts the different steps such as the tack welding and the pre-heating by employing specific devices such as a TIG welder and an induction heating apparatus or a gas burner. Alternatively, these different steps have been carried out respectively by making use of different single-purpose robots designed specifically for carrying out such steps.

TIG welding which has been used conventionally provides only a small heat input rate so that the localized portions of members to be welded together are molten uniformly and slowly. For the purpose of successfully carrying out the tack welding, therefore, it is necessary to oscillate the arc between these two members or to insert an additional welding wire so as to increase the amount of the melt of the welding metal. In any case, the welding operation has to be conducted under careful visual check of a skilled person.

The necessity for the preparatory works such as tack welding and pre-heating, which requires a high degree of skill and high strictness of check, seriously impairs the efficiency and causes an impediment on the effort for saving labor when plasma welding is applied to all-position welding of circumferential pipe joints.

SUMMARY OF THE INVENTION

Accordingly, an object of the present invention is to provide plasma welding method and apparatus which enable various preparatory steps such as tack welding and pre-heating to be conducted easily and which enable even those who are not licensed to conduct all the steps of the plasma welding operation, thereby to improve the efficiency while saving labor significantly.

To this end, according to the invention, members to be plasma-welded to each other are positioned in abutting relation and tack-welded automatically by means of a plasma in accordance with the states of the members to be welded.

According to the invention, it is also possible to conduct further steps of welding such as keyhole welding conducted after the tack welding and finish padding subsequent to the keyhole welding automatically by means of plasma in accordance with the respective data concerning the conditions of the respective welding steps.

Thus, the present invention provides, in one feature, a plasma welding method in which a time sequence of welding operation is beforehand stored in a controller in relation to factors or conditions of welding such as the size, material and welding direction and the controller delivers welding commands in accordance with the welding conditions thereby causing a welding torch to move around a welding object so as to conduct the successive welding steps including the tack welding, keyhole welding and finish padding by means of plasma.

In another feature of the present invehtion, there is provided a plasma welding apparatus comprising a welding torch, a welding head rotatably carrying the welding torch and adapted for fixing the members to be welded, a controller for storing a time sequence under optimum welding conditions in relation to various factors or conditions of the members, a power supply system for supplying welding current and welding speed instruction signal to the welding head in accordance with welding command from the controller, and a gas supplying system adapted for supplying a plasma gas at a rate corresponding to the welding command from the controller.

DESCRIPTION OF THE PREFERRED EMBODIMENTS

Preferred embodiments of the present invention will be described hereinunder with reference to the accompanying drawings.

Figure 1:
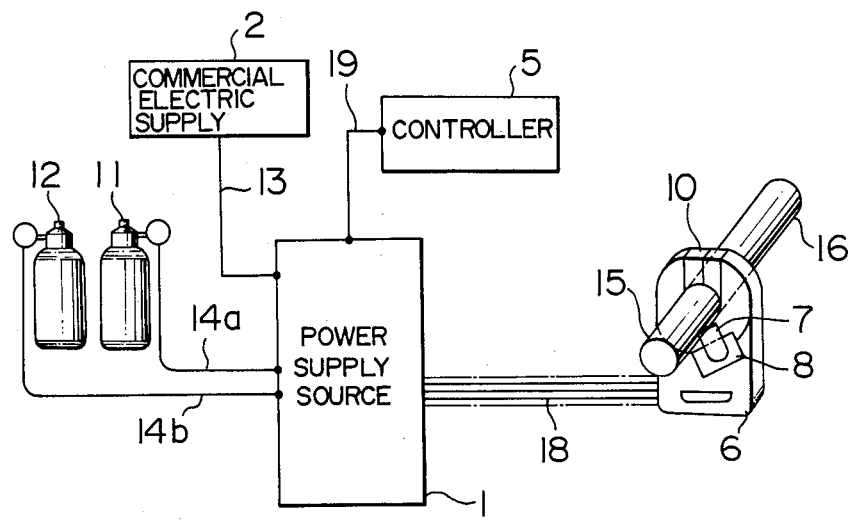
FIG. 1 is a schematic illustration of the whole of an embodiment of a plasma welding apparatus in accordance with the present invention.

Referring first to FIG. 1, an embodiment of the plasma welding apparatus in accordance with the present invention has a welding torch 7 which is rotatably mounted on a welding head 6 through a torch mount 8. The welding head 6 has a clamp 10 for suspending and fixing members 15 and 16 which are to be welded together. The plasma welding apparatus further has a controller 5 which stores a time sequence for the optimum welding operation in relation to the optimum values of factors of the welding operation, such as welding current, welding speed and so forth corresponding to the conditions of the members to be welded, such as sizes, materials and temperatures of these materials, for each of the steps of the welding operation, i.e., the pre-heating, tack welding, keyhole welding and finish padding. The plasma welding apparatus further has a power supply source 1 which is adapted to feed to the welding head 6 welding current and welding speed signal which are determined in accordance with a welding command issued by the controller 5. In addition, a plasma gas cylinder 11 and a shield gas cylinder 12 are provided for the purpose of storing plasma gas and shield gas which are to be supplied through the power supply source 1 to the welding torch 7 at rates which are determined in accordance with a command given by the controller 5. The plasma gas and the shield gas are supplied from the respective cylinders 11 and 12 to the power supply source through gas hoses 14a and 14b. The controller 5 is connected to a commercial electric supply 2 through a cable 13 and the power supply system 1 through a communication cable 19 so that outputs of the controller 5, including both the welding current and the welding speed signal, are delivered to the welding head 6 through a power cable hose 18 via the power supply system 1. Meanwhile, the plasma gas and the shield gas which have been supplied to the power supply source 1 also are delivered to the welding head 6 also through the power cable hose 18.

Figure 2:
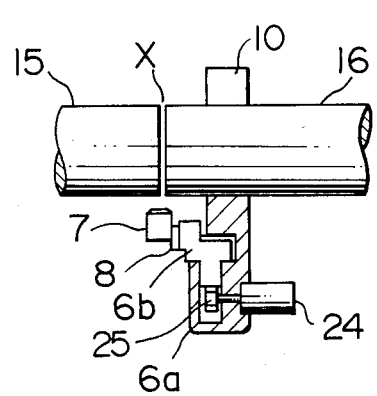
FIG. 2 is a front elevation of the plasma welding apparatus shown in FIG. 1, illustrating the positional relationship between the welding head, welding torch and members to be welded.
Figure 3:
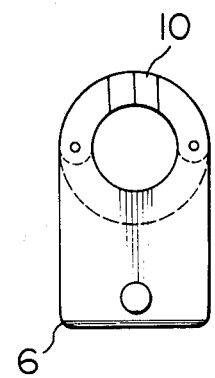
FIG. 3 is a side elevation of the portion of the plasma welding apparatus shown in FIG. 2.

FIGS. 2 and 3 show the relationships between the welding head 6, the welding torch 7 and the members 15 and 16 to be welded. As will be seen from these Figures, the welding head 6 is fixed to the members 15 and 16 by means of the clamp 10 provided thereon. The welding head 6 is constituted by a case 6a and a rotary gear 6b. The arrangement is such that the rotary gear 6b is driven by a drive motor 24 through a pinion 25 so that the welding torch 7 is moved around the member 16 such that it traces a circumferential line X determined by the bevel.

Figure 4:
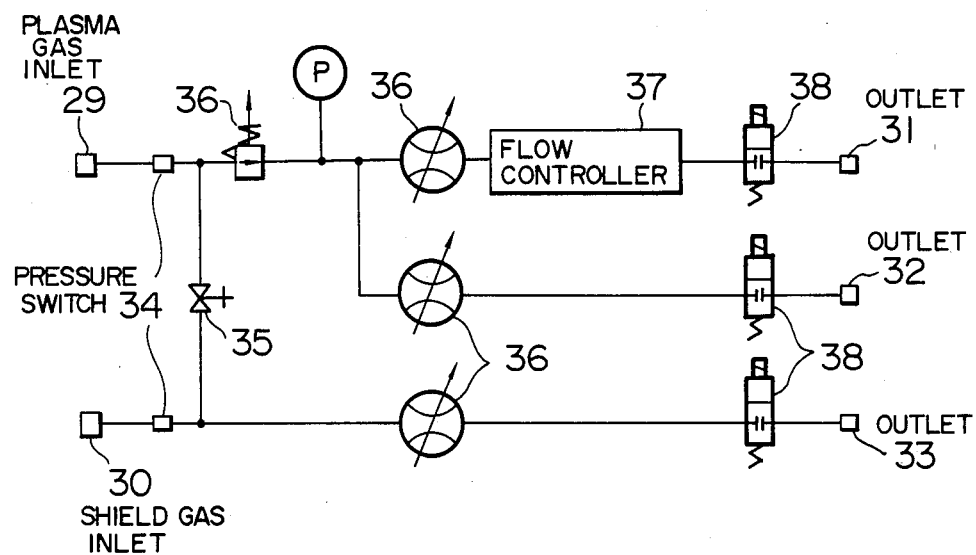
FIG. 4 is a diagram showing the arrangement of a gas control section of a power supply system.

FIG. 4 shows the detail of a gas control section incorporated in the power supply source 1. It will be seen that the gas hoses 14a and 14b which connect the plasma gas cylinder 11 and the shield gas cylinder 12 to the power supply source 1 are coupled to a plasma gas inlet 29 and a shield gas inlet 30, respectively, through couplings which are adapted to open the inlets 29 and 30 only when the hoses are coupled to these inlets.

The plasma gas circuit leading from the plasma gas inlet 29 to a plasma gas outlet 31 includes a pressure switch 34, a flow meter 36 and a solenoid valve 38. Similarly, the shield gas circuit leading from the shield gas inlet 30 to a shield gas outlet 33 has a pressure switch 34, a flow meter 36 and a solenoid valve 38. A back shield gas circuit, which branches from an intermediate portion of the shield gas circuit and leading to a back shield gas outlet 32, also has a flow meter 36 and a solenoid valve 38. These outlets 31, 32 and 33 of the respective circuits are connected to the respective lines assembled in the power cable hose 18. A flow controller 37 is disposed at an intermediate portion of the plasma gas circuit. The plasma gas circuit and the shield gas circuit are connectable with each other through a communication valve 35. Thus, the welding system can operate with only one gas cylinder provided that the shield gas and the plasma gas have an identical gas composition. Gas supply rate control commands issued from the controller 5 are delivered to the flow controller 37 and the respective solenoid valves 38 so that the gases are supplied at the controlled flow rates through the outlets of the respective gas circuits.

Figure 5:
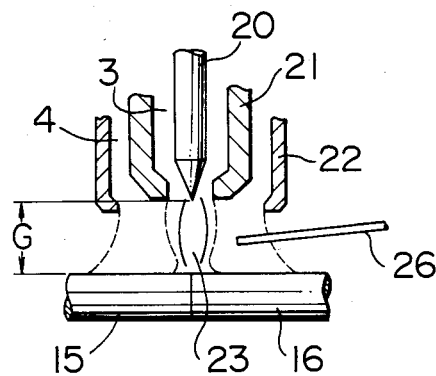
FIG. 5 is a sectional view of the welding torch suitable for use in the plasma welding apparatus in accordance with the present invention.

FIG. 5 shows the detail of the welding torch 7 used in this embodiment of the plasma welding apparatus. The welding torch 7 has a torch body 21 which surrounds an electrode rod 20 leaving a predetermined annular gap therebetween. The electrode rod 20 is supported by the torch body 21 through the intermediary of an electrically insulating supporting means, not shown, and is spaced from the members 15 and 16 to be welded by a predetermined stand-off distance G. The torch also has a shield cover 22 which surrounds the torch body 21 leaving a predetermined annular gap therebetween. The annular gap between the electrode rod 20 and the torch body 21 constitutes a passage for the plasma gas 3, while the annular gap between the torch body 21 and the shield cover gas 22 constitutes a passage for the shield gas 4.

Normally, the electrode rod 20 constitutes a cathode, while the torch body 21 constitutes an anode so that a pilot arc voltage is developed between these anode and cathode.

The members 15 and 16 to be welded also constitute anodes. The voltage applied between the electrode rod 20 serving as the cathode and the members 15 and 16 serving as anodes is the plasma arc voltage. The welding current which directly contributes to the welding is supplied in the form of a plasma arc. Namely, the welding current is supplied in the form of an arc column 23 which is jetted through an open end of the torch body 21 together with the plasma gas 3, thereby welding the members 15 and 16 to connect them together. Meanwhile, the shield gas 4 is supplied from the space inside the shield gas cover 22 in such a manner as to envelope the plasma gas 3.

The welding torch 7 having the described construction is adapted to be mounted on the welding head 6 through the torch mount 8 such that it can be directed optimumly for each welding operation in the welding process. The welding head 6 carrying the welding torch 7 has the clamp 10 which clamps either one of the members 15 and 16 to be welded. The welding head 6 also carries a wire feeding unit adapted to store and feed a wire which is used in the finish padding.

Figure 6:
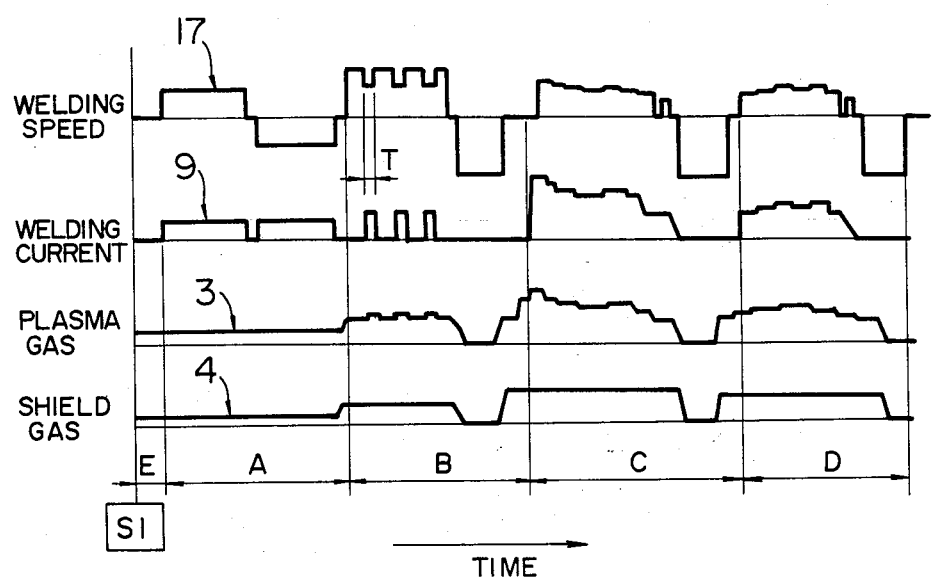
FIG. 6 shows time charts for respective welding operations performed by he plasma welding apparatus of the present invention.

FIG. 6 shows a time chart of a process for conducting a plasma welding including successive steps of pre-heating A, tack welding B, keyhole welding C and finish padding D, with the time represented by the axis of abscissa.

The process is started by commencing the supply of the plasma gas 3 and the shield gas 4 at a moment S1. After the lapse of a predetermined time E which is necessary for the flow of the gases to be stabilized, welding current 9 is supplied to the welding torch 7. The welding torch 7 supplied with the welding current is rotated by means of an actuator (not shown) incorporated in the welding head 6, at a welding speed 17 commanded by the controller 5. In FIG. 6, the plus or positive portion of the welding speed 17 represents forward rotation of the welding torch, while minus or negatve portion of the same represents backward rotation of the welding torch 7. It will be seen that the welding torch 7 rotates in the forward direction and in the backward direction alternatingly so as to prevent the power cable hoe 18 from being wound around the members 15 and 16 to be welded. The pre-heating A can be conducted by rotating the welding torch 7 forwardly and backwardly at the same speed. However, in each of other steps, i.e., the tack welding B, keyhole welding C and the finish padding D, the direction of rotation of the welding torch 7 is reversed after the completion of the welding which is conducted during forward rotation of the welding torch 7, as will be seen from FIG. 6, so that the power cable hose 18 is prevented from being wound around the welded members. The backward rotation of the welding torch 7 after the completion of the finish padding D is necessary in order to set the welding apparatus in the initial position in which the welding head 6 is suspended from the welded member 15 or 16 through the clamp 10.

Figure 7A:
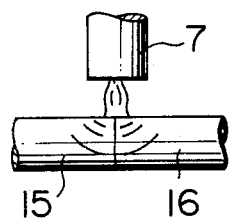
FIG. 7A is an illustration of the manner in which a pre-heating is conducted by the plasma welding apparatus of the present invention.
Figure 7B:
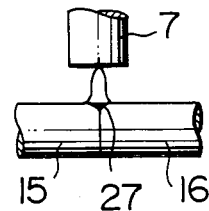
FIG. 7B is an illustration of the manner in which a tack welding is conducted by the plasma welding apparatus of the present invention.
Figure 7C:
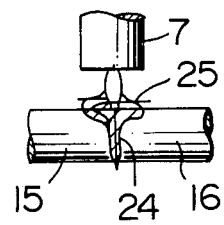
FIG. 7C is an illustration of the manner in which keyhole welding and finish padding are conducted by the plasma welding apparatus of the present invention.

FIGS. 7A to 7C show the details of the successive operations of the welding process.

More specifically, FIG. 7A shows the manner in which the pre-heating A is conducted. In this step, the supply of the welding current is set at a level suitable for the pre-heating of the surfaces of the members 15 and 16 to be welded. The plasma gas 3 is supplied for the purpose of providing a path for the welding current, while the shield gas 4 is used for the purpose of preventing oxidation of the surfaces of the members 15 and 16 to be welded.

FIG. 7B shows the manner in which the tack welding B is conducted. The factors of the welding operation, i.e., the level of the welding current 9, welding length which is the product of the welding time T and the welding speed 17 and flow rates of the plasma gas 3 and the shield gas 4, are so controlled that tack weld beads 27 corresponding to the sizes of the members 15 and 16 to be welded are obtained. The number of the points where the tack welding is conducted is determined by the number of peaks of the welding current 9.

FIG. 7C shows the manners in which the keyhole welding C and the pad welding D are conducted. This Figure shows a cross-section of the bead which is peculiar to the plasma welding. Namely, both members 15 and 16 to be welded are molten by the welding current 9 and the plasma gas 3 penetrates into the bevel so as to form a keyhole bead 24 thereby completing the keyhole welding C. The finish padding D is conducted for the purpose of forming a convex surface bead 25. This is accomplished by conducting the welding while feeding the wire 26 as shown in FIG. 5. It will be understood that the beads 27 formed in the tack welding B merge in the keyhole bead 24 formed in the keyhole welding C.

The plasma welding apparatus of the present invention is used in a manner which will be described hereunder. Optimum time sequences for the welding current 9, the welding speed 17 and the flow rates of the plasma gas 3 and the shield gas 4 are determined beforehand as shown in FIG. 6 through experiments in relation to various factors such as the sizes and materials of the members 15 and 16 to be welded, welding direction, and so forth. The thus determined time sequences are stored in the controller 5. Then, the commercial electric power supply 2 is connected to the power supply source 1 to which also connected are the gas cylinders 11 and 12. Then, the clamp 10 of the welding head is operated to clamp one of the members 15 and 16 to be welded such that the welding head 6 is suspended from the one member. A command is then given for starting the plasma welding apparatus. In response to the starting command, the plasma welding apparatus commences the welding process and conduct the successive steps, i.e., the pre-heating A, the tack welding B, the keyhole welding C and the finish padding D, in the manners explained before in connection with FIGS. 7A to 7C.

With the plasma welding apparatus described hereinbefore, the operator is required only to prepare and set the members 15 and 16 to be welded, to give the starting command and to support one of the members 15 and 16 during the tack welding.

As stated before, the welding work for welding objects by the conventional all-position plasma welding method has required a licensed person to conduct the respective steps of pre-heating, tack welding, keyhole welding and finish padding by employing different types of welders and equipment. In contrast, according to the invention, such a welding work can be conducted by a single plasma welding apparatus which can be controlled even by an operator who is not so skilled. Thus, the present invention contributes to an improvement in the efficiency of the work and appreciably saves the labor while reducing costs.

Figure 8:
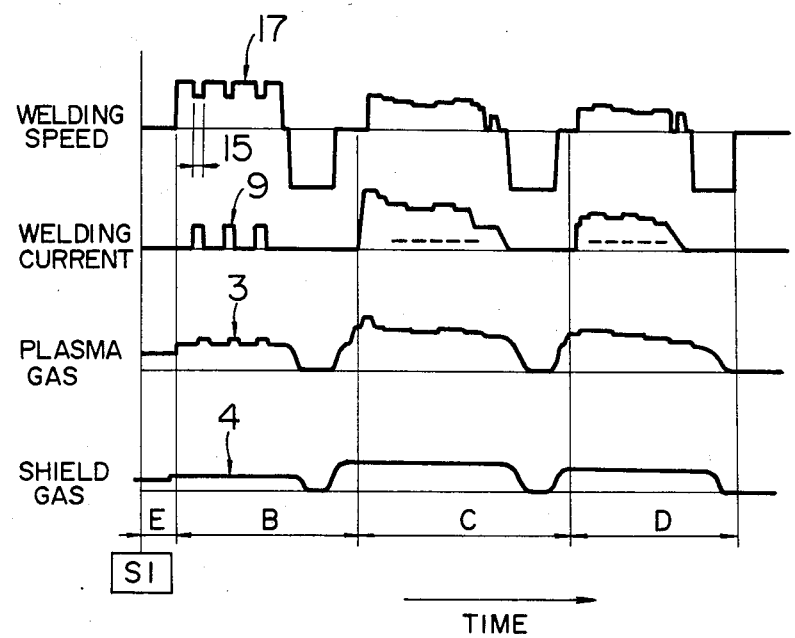
FIG. 8 shows time charts of welding operations in respective steps of the welding work conducted by the plasma welding apparatus of the present invention to connect carbon steel pipes.

A description will be made hereinunder with specific reference to FIG. 8 as to a practical example of the welding conditions for welding carbon steel pipes made of 50A(2B)SCh40 and placed horizontally, in accordance with the plasma welding method of the present invention.

In this case, the plasma welding process included only three steps, i.e., tack welding B, keyhole welding C and finish padding D. Namely, the pre-heating A was omitted in view of the facts that the members 15 and 16 are made of a carbon steel and that the welding is conducted at normal welding temperature.

The tack welding B was conducted with the flow rate of the plasma gas 3 of about 1.5 l/min, with the welding current 9 of about 70A and with the welding speed 17 of about 80 mm/min. The tack welding B was effected on three points which are located on positions of half past 2, half past 6 and half past 10 on a clock along the circumference of the pipes. The welding time T at each welding point was 15 seconds.

The keyhole welding C was conducted with the flow rate of the plasma gas 3 of about 2.5 l/min, with the welding current 9 of about 120A and with the welding speed 17 of about 100 mm/min. The value of the welding current 9 mentioned above is the peak level of the welding current employed in this step. More specifically, the keyhole welding C was conducted by using welding current which has a base level of about 20A and the peak level of about 120A. The time ratio between the peak level and the base level was 4:6 and the welding current was supplied at a frequency of about 1 Hz.

The finish padding D was conducted with the flow rate of the plasma gas 3 of about 2 l/min, with the welding current 9 of about 100A and with the welding speed 17 of amount 100 mm/min. The above-mentioned value of the welding current shows the peak level of the welding current. The base level of the welding current was about 15A and the time ratio between the peak level and the base level was 4:7. It was confirmed that a finish bead having a good appearance can be obtained by conducting the finish padding D under the above-specified conditions and with the welding current supplied at a frequency of about 1 Hz.

As will be understood from the foregoing description, according to the present invention, the operator can conduct tack welding of objects with plasma welding method simply by controlling the factors such as the welding current, plasma gas flow rate and so forth. This in turn makes it possible to combine the tack welding step with other steps of welding process such as keyhole welding and finish padding which can be conducted by a plasma welding apparatus. It is thus possible to formulate an arc welding process which is composed of a series of steps including pre-heating, tack welding, keyhole welding and finish padding all of which can be conducted by the same plasma welding apparatus.

It is also to be understood that the plasma welding process including these steps can be conducted automatically in accordance with a control sequence which is beforehand stored in a controller in relation to various factors or parameters such as the sizes and materials of the members to be welded.

In consequence, the present invention enables even an operator who is not so highly skilled to conduct the successive steps of the plasma welding process without any fluctuation in the quality of the weld products, thus contributing greatly to the saving of labor as well as to improvements in the efficiency and economy.

What is claimed is:

1. A method of automatically conducting an all position plasma welding of sections of pipes, comprising the steps of:

preparing a plasma welding apparatus including a welding torch, a welding head mounted on one of said pipe sections and having a torch-rotating means supporting said welding torch for rotation around said one pipe section at a desired speed, plasma and shield gas supply sources, a welding power supply source, means for driving said torch-rotating means to cause said welding torch to achieve an all position welding of said pipe sections one to the other, and a controller operative to control a rate of supply of a welding current from said welding power supply source, rates of supplies of the plasma and shield gases to said welding torch and a speed of said driving means;

placing said another of said pipe sections in abutting relation to said one pipe section;

pre-heating of weld portions of said pipe sections by a plasma flame produced by said welding torch while the rates of the supplies of the welding current and the plasma and shield gases and the speed of the movement of said welding torch are controlled by said controller;

then, tack-welding said pipe sections to tentatively fix the sections together;

thereafter, automatically conducting keyhole welding and finish padding by the plasma flame from said welding torch and in accordance with parameters of said pipes;

the pre-heating step being conducted such that the supplied welding current and plasma and shield gases are restricted and the welding speed is controlled by said controller in accordance with the sizes of the pipes to be welded; and the tack-welding step being conducted such that the rates of supplies of the welding current and the plasma and shield gases are more restricted by said controller than in the keyhole welding and final padding steps.

2. A method of automatically conducting an all position plasma welding of sections of pipes, comprising the steps of:

preparing a plasma welding apparatus including a welding torch, a welding head mounted on one of said pipe sections and having a torch-rotating means supporting said welding torch for rotation around said one pipe section at a desired speed, plasma and shield gas supply sources, a welding power supply source, means for driving said torch-rotating means to cause said welding torch to achieve an all position welding of said pipe sections one to the other, and a controller operative to control a rate of supply of a welding current from said welding power suppy source, rates of supplies of the plasma and shield gases to said welding torch and a speed of said driving means;

formulating a time sequence of optimum welding conditions for each of successive welding operations including a tack welding, a keyhole welding and a finish padding and inputting the thus formulated time sequence into said controller;

placing said another of said pipe sections in abutting relation to said fixed pipe;

storing in said controller data of conditions of welding operations in accordance with the parameters of said pipes, the stored data of conditions including those related to rates of supplies of the welding current and the plasma and shield gases and speed of movement of said welding torch;

operating said controller to generate to said welding power supply source, to said plasma and shield gas supply soures and to said driving means, respectively, command values of the rates of supplies of the welding current and the plasma and shield gases and speed of movement of said welding torch;

conducting a pre-heating of weld portions of said pipes in accordance with the thus generated command values;

operating said driving means to rotate said welding torch around said weldl portions of said pipes while said welding torch is controlled in accordance with optimum conditions of the tack-welding, keyhole welding and finish padding stored in said controller, whereby the tack-welding, keyhole welding and finish padding are automatically conducted in the mentioned order.

3. A method of joining the peripheries of two sections of pipes by use of plasma welding apparatus which includes:

a welding torch having an electrode, a first plasma gas channel and a second shield gas channel;

means on one of said pipes supporting said welding torch for rotation about the periphery of one of the pipe sections in opposite directions at controlled speeds;

plasma gas and shield gas supply sources;

an electrical power supply source for producing a welding current of adjustable magnitude; and a controller for generating signals which simultaneously control the rotation of and the rates of gas flow and electric current flow to said welding torch; said method comprising:

rotating the welding torch around said one pipe section in a first direction and then in a second direction while providing a current and gas flow during one of said rotations to preheat a region of said pipe sections in response to a first signal from said controller;

rotating the welding torch around said one pipe section in a first direction and then in a second direction while providing a current and gas glow during one of said rotations to tack weld said preheated pipe sections in response to a second signal set from said controller;

rotating the welding torch around said one pipe section in a first direction and then in a second direction while providing a current and gas flow during one of said rotations to keyhole weld the tack welded region of said pipe sections in response to a third signal set from said controller; and rotating the welding torch around said one pipe section in a first direction and then in a second direction while providing a current and gas flow during one of said rotations to finish padding by the plasma flame said region of the pipe sections in response to a fourth signal set from said controller.

4. Apparatus for automatically conducting an all position plasma welding of two pipes, comprising:

a welding torch;

a welding head adapted to be mounted on a first pipe and having a torch-rotating means supporting said welding torch for rotation around said first pipe at a desired speed;

means on said welding head for driving said torch-rotating means;

a controller storing therein parameters relating to said first pipe and another pipe to be welded thereto and a time sequence of optimum welding currents and welding speed for each of successive welding operations including a tack welding, a keyhole welding and a finish padding, said controller also storing therein optimum controls for said tack welding, said keyhole welding and said finish padding operations;

an electric power supply system for transmitting a welding current signal and a welding speed signal to said welding head in accordance with a command from said controller; and a gas supply system for supplying plasma and shield gases to said welding torch at rates in accordance with commands from said controller.

5. Apparatus as defined in claim 4 wherein the welding head driving means includes means for driving the welding torch around the entire pereiphery of one of said pipes in a first direction and thereafter to drive said welding torch in an opposite direction.

* * * * *